United States Patent
Khan et al.

(10) Patent No.: US 11,223,418 B2
(45) Date of Patent: Jan. 11, 2022

(54) MULTI-BAND SATELLITE TERMINAL ESTIMATING A SECOND BAND BASED ON FIRST BAND LINK CONDITIONS

(71) Applicant: HUGHES NETWORK SYSTEMS, LLC, Germantown, MD (US)

(72) Inventors: Tayyab Khan, Germantown, MD (US); Krishna Samavedam, Germantown, MD (US); George Choquette, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 26 days.

(21) Appl. No.: 16/731,605

(22) Filed: Dec. 31, 2019

(65) Prior Publication Data
US 2021/0203410 A1   Jul. 1, 2021

(51) Int. Cl.
*H04B 7/185* (2006.01)
*H04H 40/90* (2008.01)
(Continued)

(52) U.S. Cl.
CPC ..... *H04B 7/18513* (2013.01); *H04B 7/18515* (2013.01); *H04B 7/18534* (2013.01);
(Continued)

(58) Field of Classification Search
CPC .............. H04B 17/318; H04B 7/18536; H04B 7/18541; H04B 17/00; H04B 17/0092;
(Continued)

(56) References Cited

U.S. PATENT DOCUMENTS

| 8,358,657 B2 | 1/2013 | Thesling |
| 10,193,657 B2 | 1/2019 | Subramaniam et al. |

(Continued)

FOREIGN PATENT DOCUMENTS

| EP | 2608421 | 6/2013 |
| WO | WO 2008/129509 | 10/2008 |

(Continued)

OTHER PUBLICATIONS

International Search Report and Written Opinion dated Apr. 29, 2021 for International Application No. PCT/US2020/067306, filed Dec. 29, 2020.

*Primary Examiner* — Philip Sobutka
(74) *Attorney, Agent, or Firm* — Sheppard, Mullin, Richter & Hampton LLP (57) ABSTRACT

Systems and methods for operating a multi-band satellite terminal are disclosed. One aspect disclosed features a method, comprising: controlling a multi-band satellite terminal capable of receiving signals on a plurality of frequency bands to receive a signal transmitted by a satellite on a first frequency band of the plurality of frequency bands; determining link conditions of the first frequency band based on the received signal; generating an estimate of link conditions of a second frequency band of the plurality of frequency bands, wherein the estimate is generated based on the link conditions of the first frequency band; selecting the second frequency band based on the estimate of the link conditions of the second frequency band; and controlling the multi-band satellite ground terminal to receive the signal transmitted by the satellite on the second frequency band.

32 Claims, 7 Drawing Sheets

(51) Int. Cl.
*H04L 1/00* (2006.01)
*H04W 72/04* (2009.01)
*H04W 72/08* (2009.01)

(52) U.S. Cl.
CPC ......... *H04B 7/18563* (2013.01); *H04H 40/90* (2013.01); *H04L 1/0003* (2013.01); *H04W 72/0453* (2013.01); *H04W 72/085* (2013.01)

(58) Field of Classification Search
CPC .... H04B 17/30; H04B 17/309; H04B 17/373; H04B 17/382; H04W 36/30; H04W 24/00; H04W 24/02
USPC ........................................ 455/427, 13.4, 522
See application file for complete search history.

(56) References Cited

U.S. PATENT DOCUMENTS

| | | | |
|---|---|---|---|
| 2003/0016634 A1 | 1/2003 | Freedman et al. | |
| 2006/0104340 A1* | 5/2006 | Walton ................. | H04L 1/0002 375/227 |
| 2020/0288426 A1* | 9/2020 | Pascolini .............. | H04W 64/00 |

FOREIGN PATENT DOCUMENTS

| WO | WO 2010/144918 | 12/2010 |
|---|---|---|
| WO | WO 2018/213646 | 11/2018 |

\* cited by examiner

MULTI-BAND SATELLITE TERMINAL ESTIMATING A SECOND BAND BASED ON FIRST BAND LINK CONDITIONS

TECHNICAL FIELD

The present disclosure relates generally to satellite networks. More particularly, some embodiments of the present disclosure are directed toward systems and methods for a multi-band satellite terminal.

BACKGROUND

Modern satellite communication systems provide a robust and reliable infrastructure to distribute voice, data, and video signals for global exchange and broadcast of information. These satellite communication systems have emerged as a viable option to terrestrial communication systems for carrying data traffic such as Internet traffic. A typical satellite Internet system comprises subscriber terminals, a satellite, a ground station, and connectivity to the internet. Communication in such a system occurs along two links: 1) a link from a subscriber terminal to the satellite to the ground station to the gateway to the internet, referred to as an "inroute," and 2) a link from the internet to the gateway to the ground station to the satellite to the subscriber terminal, commonly referred to as an "outroute."

SUMMARY

In general, one aspect disclosed features a multi-band satellite terminal capable of receiving signals on a plurality of frequency bands, comprising: a hardware processor; and a non-transitory machine-readable storage medium storing instructions executable by the hardware processor to perform a method comprising: controlling a multi-band satellite terminal capable of receiving signals on a plurality of frequency bands to receive a signal transmitted by a satellite on a first frequency band of the plurality of frequency bands; determining link conditions of the first frequency band based on the received signal; generating an estimate of link conditions of a second frequency band of the plurality of frequency bands, wherein the estimate is generated based on the link conditions of the first frequency band; selecting the second frequency band based on the estimate of the link conditions of the second frequency band; and controlling the multi-band satellite ground terminal to receive the signal transmitted by the satellite on the second frequency band.

Embodiments of the multi-band satellite terminal may include one or more of the following features. Some embodiments comprise comparing the estimate of the link conditions to desired link conditions; and selecting the second frequency band based on the comparing. In some embodiments, the estimate of the link conditions include an estimate of the link conditions for a plurality of modulation and coding schemes, the method further comprising: selecting one of the modulation and coding schemes based on the estimates of the link conditions for the plurality of modulation and coding schemes; and controlling the multi-band satellite ground terminal to receive the signal transmitted by the satellite using the selected one of the modulation and coding schemes. In some embodiments, the link conditions comprise at least one of signal quality or signal level. Some embodiments comprise determining a current traffic level for the second frequency band; and selecting the second frequency bands based on the current traffic levels. Some embodiments comprise transmitting the estimate of the link conditions to a gateway; receiving a band selection from the gateway; and selecting the second frequency band based on the band selection. In some embodiments, the multi-band satellite terminal comprises a very small aperture terminal (VSAT).

In general, one aspect disclosed features a non-transitory machine-readable storage medium storing instructions executable by a hardware processor of a computing component, the machine-readable storage medium comprising instructions to cause the hardware processor to perform a method comprising: controlling a multi-band satellite terminal capable of receiving signals on a plurality of frequency bands to receive a signal transmitted by a satellite on a first frequency band of the plurality of frequency bands; determining link conditions of the first frequency band based on the received signal; generating an estimate of link conditions of a second frequency band of the plurality of frequency bands, wherein the estimate is generated based on the link conditions of the first frequency band; selecting the second frequency band based on the estimate of the link conditions of the second frequency band; and controlling the multi-band satellite ground terminal to receive the signal transmitted by the satellite on the second frequency band.

Embodiments of the non-transitory machine-readable storage medium may include one or more of the following features. Some embodiments comprise comparing the estimate of the link conditions to desired link conditions; and selecting the second frequency band based on the comparing. In some embodiments, the estimate of the link conditions include an estimate of the link conditions for a plurality of modulation and coding schemes, the method further comprising: selecting one of the modulation and coding schemes based on the estimates of the link conditions for the plurality of modulation and coding schemes; and controlling the multi-band satellite ground terminal to receive the signal transmitted by the satellite using the selected one of the modulation and coding schemes. In some embodiments, the link conditions comprise at least one of signal quality or signal level. Some embodiments comprise determining a current traffic level for the second frequency band; and selecting the second frequency bands based on the current traffic levels. Some embodiments comprise transmitting the estimate of the link conditions to a gateway; receiving a band selection from the gateway; and selecting the second frequency band based on the band selection. In some embodiments, the terminal comprises a very small aperture terminal (VSAT).

In general, one aspect disclosed features a method, comprising: controlling a multi-band satellite terminal capable of receiving signals on a plurality of frequency bands to receive a signal transmitted by a satellite on a first frequency band of the plurality of frequency bands; determining link conditions of the first frequency band based on the received signal; generating an estimate of link conditions of a second frequency band of the plurality of frequency bands, wherein the estimate is generated based on the link conditions of the first frequency band; selecting the second frequency band based on the estimate of the link conditions of the second frequency band; and controlling the multi-band satellite ground terminal to receive the signal transmitted by the satellite on the second frequency band.

Embodiments of the method may include one or more of the following features. Some embodiments comprise comparing the estimate of the link conditions to desired link conditions; and selecting the second frequency band based on the comparing. In some embodiments, the estimate of the link conditions include an estimate of the link conditions for a plurality of modulation and coding schemes, the method further comprising: selecting one of the modulation and coding schemes based on the estimates of the link conditions for the plurality of modulation and coding schemes; and controlling the multi-band satellite ground terminal to receive the signal transmitted by the satellite using the selected one of the modulation and coding schemes. In some embodiments, the link conditions comprise at least one of signal quality or signal level. Some embodiments comprise determining a current traffic level for the second frequency band; and selecting the second frequency bands based on the current traffic levels. Some embodiments comprise transmitting the estimate of the link conditions to a gateway; receiving a band selection from the gateway; and selecting the second frequency band based on the band selection.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Various embodiments of the systems and methods disclosed herein provide techniques for operating a multi-band terminal in a multi-band satellite network system to improve the capacity of the system while maintaining the quality and availability of the satellite link with the terminal.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

In order to maximize system availability while providing the best quality of service (QoS) to the end-user, current satellite systems feature terminals that dynamically switch between various modulations and forward error-correction code rates (MODCODs). For satellite terminals that can operate only in a single frequency band (e.g., Ka band only), a terminal may determine the optimal MODCOD based on link conditions. For example, a terminal may switch from one MODCOD to another in response to a change in the link conditions, such as signal fade due to weather.

Satellite systems may respond to these changes by moving terminals from one outroute frequency channel to another. For example, the system may monitor the traffic load across the various outroute channels to keeps traffic loads balanced by moving terminals between the channels. So, for a single band system, the terminal utilizes the best MODCOD for its current link conditions, and the system performs load balancing by moving terminals between the frequency channels.

Some satellite systems may feature multi-band satellite terminals. For example, a satellite terminal may be capable of operating in any of the Ku, Ka, Q, and V frequency bands, where Ku is a lower frequency band than Ka, which is lower than Q and so on. The lower bands offer more robust links in that they are less impacted by weather impairments. Conversely, higher frequency bands are less robust as they are impacted more due to weather impairments.

In any satellite system one of the key challenges is to utilize the satellite frequency spectrum efficiently and optimally, meaning that that the spectrum is used to maximize the amount of data it carries. Generally, a given spectrum is broken into smaller channels, e.g. a 1000 MHz band of frequency may be configured as 4 channels of 250 MHz. A population of satellite terminals are distributed to use these channels such that each of these channels is maximized in its use, meaning that a situation does not occur where some channels are congested because too many terminals are assigned to them while other channels are under-utilized because fewer terminals are using them. Therefore, the satellite system dynamically moves terminals between channels to keep the traffic load across all channels balanced. In such systems with multiple frequency bands available, the optimization of system availability and capacity may include selecting frequency bands in addition to frequency channels and MODCODs.

Figure 1:
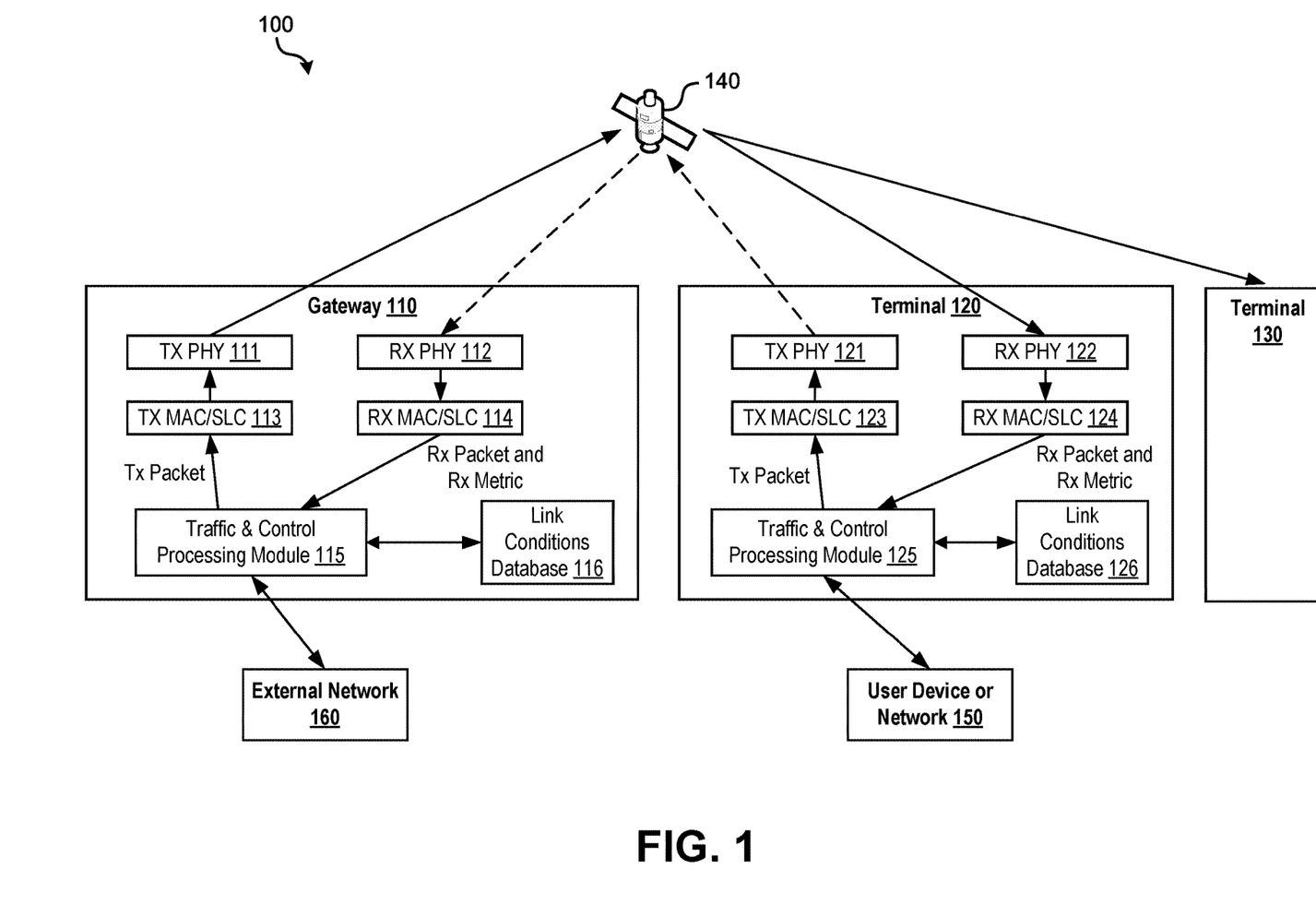
FIG. 1 illustrates an example transponded satellite system according to embodiments of the disclosed technology.

FIG. 1 illustrates an example transponded satellite system 100 according to embodiments of the disclosed technology. The satellite system may include a satellite that relays traffic between a gateway and one or more satellite terminals. In the satellite system 100 of FIG. 1, a satellite 140 relays traffic between a gateway 110 and terminals 120 and 130. The terminals 120 and 130 may be implemented as very small aperture terminals (VSAT). But while only two satellite terminals are depicted, it should be understood that the disclosed satellite systems may include many more satellite terminals. In the example of FIG. 1, the outroutes are depicted in solid arrows, while the inroutes are depicted as broken arrows.

The satellite 140 may be any suitable communications satellite. For example, the satellite 140 may be a bent-pipe design geostationary satellite. The satellite 140 may use one or more spot beams as well as frequency and polarization reuse to maximize the total capacity of the satellite system 100. Signals passing through the satellite 140 on the outroute may be based on the DVB-S2 standard (ETSI EN 302 307) using signal constellations up to and including 32-APSK or higher order modulation formats. The signals intended to pass through the satellite 140 on the inroute may be based on the Internet Protocol over Satellite (IPoS) standard (ETSI TS 102 354). Other suitable signal types may also be used in either direction, including, for example higher data rate variations of DVB-S2.

The gateway 110 may exchange traffic with an external network 160. For example, the external network 160 may be the Internet, and the gateway 110 may exchange packets of data with the Internet. Data intended for terminal 120 and 130 may be in the form of IP packets, including TCP packets and UDP packets, or any other suitable IP packets. Similarly, IP packets may enter the network via the terminals 120 and 130, be processed by terminals, and be transmitted to satellite 140.

For brevity, the structure and function of the satellite terminal is described only for terminal 120. Other terminals, such as terminal 130, may have similar structure and function. The terminal 120 may exchange traffic with a user device or network 150. For example, the user device or network 150 may include a local area network (LAN) that includes one or more computers, and the terminal 120 may exchange packets data with the computers over the LAN. For example, the terminal 120 may be used at a residence or place of business to provide a user with access to the Internet, and may include a remote satellite dish for receiving RF signals from and transmitting RF signals to the satellite 140, as well as a satellite modem and other equipment for managing the sending and receiving of data. The terminal 120 may also include one or more remote hosts, which may be computer systems or other electronic devices capable of network communications at the site.

The gateway 110 may include a transmit-side physical-layer device (TX PHY) 111, a receive-side physical-layer device (RX PHY) 112, a transmit-side media access controller/satellite link controller (TX MAC/SLC) 113, and a receive-side media access controller/satellite link controller (RX MAC/SLC) 114. The gateway 110 may also include a traffic and control processing module 115 that is in communication with the external network 160. The gateway 110 may also include a link conditions database 116.

The terminal 120 may include a transmit-side physical-layer device/tuner (TX PHY) 121, a receive-side physical-layer device/multi-band tuner (RX PHY) 122, a transmit-side media access controller/satellite link controller (TX MAC/SLC) 123, and a receive-side media access controller/satellite link controller (TX MAC/SLC) 124. The terminal 120 may also include a traffic and control processing module 125 that is in communication with the user device or network 150. The terminal 120 may also include a link conditions database 126.

In operation, on the inroute, the traffic and control processing module 125 of the terminal 120 may provide inroute transmit packets (Tx Packet) to the TX MAC/SLC 123 and TX PHY 121, which provide corresponding signals to the satellite 140. The uplink frequency band of the satellite beam may be split into any number of subband inroute frequency channels (IFC) with any number of symbol rates of, for example, 512 ksps, 1 Msps, 2 Msps, 4 Msps, etc. Depending on operating conditions (e.g. weather, status of terminal, status of satellite), the terminal 120 may attempt to transition from one IFC to a target IFC with a same, lower, or higher symbol rate.

The satellite 140 provides these signals to the RX PHY 112 and RX MAC/SLC 124 of the gateway 110, which provide the packets (Rx Packet) to the traffic and control processing module 115. The traffic and control processing module 115 may also choose the frequency band on which the satellite terminal 120 receives the signals from the satellite 140.

In operation, on the outroute, the traffic and control processing module 115 of the gateway 110 may provide outroute transmit packets (Tx Packet) to the TX MAC/SLC 113 and TX PHY 111, which provide corresponding signals to the satellite 140. The satellite 140 provides corresponding signals to the RX PHY 122 and RX MAC/SLC 124 of the terminal 120, which provide the packets (Rx Packet) to the traffic and control processing module 125. The RX PHY 122 and RX MAC/SLC 124 also generate metrics representing link conditions for the outroute downlink, that is, the outroute link from the satellite 140 to the satellite terminal 120. For example, the RX PHY 122 and RX MAC/SLC 124 may receive carriers (e.g., continuous or time division multiple access (TDMA) bursts) from the satellite 140, and may measure those carriers to generate receive quality metrics (referred to in FIG. 1 as Rx Metric). The RX PHY 122 and RX MAC/SLC 124 may provide the Rx Metric to the traffic and control processing module 125.

Figure 2:
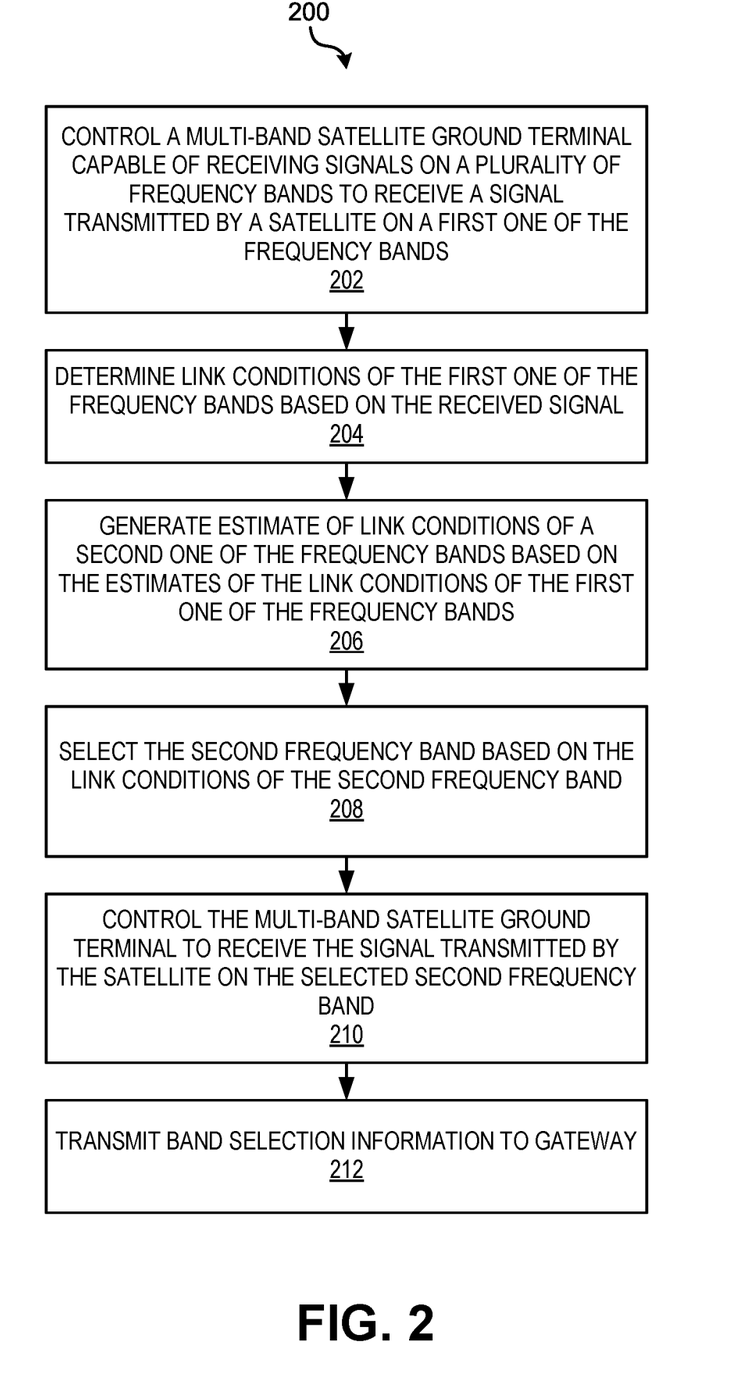
FIG. 2 illustrates a process for the satellite system where the satellite terminal 120 selects frequency bands according to embodiments of the disclosed technology.

FIG. 2 illustrates a process 200 for the satellite system 100 where the satellite terminal 120 selects frequency bands according to embodiments of the disclosed technology. Referring to FIG. 2, the process 200 may include controlling a multi-band satellite ground terminal capable of receiving signals on a plurality of frequency bands to receive a signal transmitted by the satellite on a first one of the frequency bands, at 202. The satellite terminal may be assigned a default band of operation based on its geographic location in the beam of the satellite 140. Terminals having lower signal quality factor (SQF) due to being located on the edge of the beam may default to a low-frequency band. For example, referring again to FIG. 1, the traffic and control processing module 125 may control the RX PHY 122 of the satellite terminal 120 to receive the outroute signals from the satellite 140 on the Ku band.

Referring again to FIG. 2, the process 200 may include determining conditions of the first one of the frequency bands based on the received signal, at 204. For example, referring again to FIG. 1, the RX PHY 122 and/or RX MAC/SLC 124 of the satellite terminal 120 may generate metrics indicative of the link conditions on the Q band, and may provide these metrics to the traffic and control processing module 125. The link conditions may include signal quality, signal level, other metrics, or combinations thereof. For example, the signal quality may be represented as a SQF. As another example, the signal quality and signal level may be represented as a ratio of energy per symbol to noise power spectral density (EsNo).

Referring again to FIG. 2, the process 200 may include generating estimates of link conditions of a second frequency band based on the link conditions of the first one of the frequency bands, at 206. For example, referring again to FIG. 1, the traffic and control processing module 125 of the satellite terminal 120 may generate estimates of link conditions on one of the outroute Ku, Ka, and V frequency bands based on the link conditions determined for the Q band.

In embodiments where the terminal 120 is capable of operating on two or more bands, the traffic and control processing module 125 of the satellite terminal 120 may generate estimates of link conditions on two or more of the second frequency bands. For example, in an embodiment where the terminal 120 is capable of operating in any of the Ku, Ka, Q and V frequency bands, the traffic and control processing module 125 of the satellite terminal 120 may generate estimates of link conditions on two or more of the outroute Ku, Ka, and V frequency bands based on the link conditions determined for the Q band.

The estimate(s) may include estimates of link conditions on that band for each of the MODCODS available for that band. These estimates may be generated using conventional techniques. For example, one such technique is described in the paper "A Prediction Model that Combines Rain Attenuation and Other Propagation Impairments Along Earth-Satellite Paths" by Dissanayake et al. in the Online Journal of Space Communication, Issue No. 2, Fall 2002.

Referring again to FIG. 2, the process 200 may include selecting the second frequency band based on the estimate of the link conditions of the second frequency band, at 208. For example, referring again to FIG. 1, the traffic and control processing module 125 may select the outroute Ku frequency band based on the estimates of the link conditions for that band. As an example, a sudden thunderstorm may cause the link conditions on the Q band to suddenly deteriorate, while link conditions on the lower-frequency Ku band are relatively unaffected. In this example, the traffic and control processing module 125 may select the Ku band, which may provide better service and availability under such adverse weather conditions. As another example, the end of a rainstorm may cause link conditions on the V band to improve significantly. In this example, the traffic and control processing module 125 may select the V band.

In embodiments where the terminal is capable of operating on two or more bands, the process 200 may include selecting one of the second frequency bands based on the estimates of the link conditions of two or more of the second frequency bands. For example, in an embodiment where the terminal 120 is capable of operating in any of the Ku, Ka, Q, and V frequency bands, the traffic and control processing module 125 of the satellite terminal 120 may select one of the outroute Ku, Ka, and V frequency bands based on estimates of link conditions on each of those bands.

Figure 3:
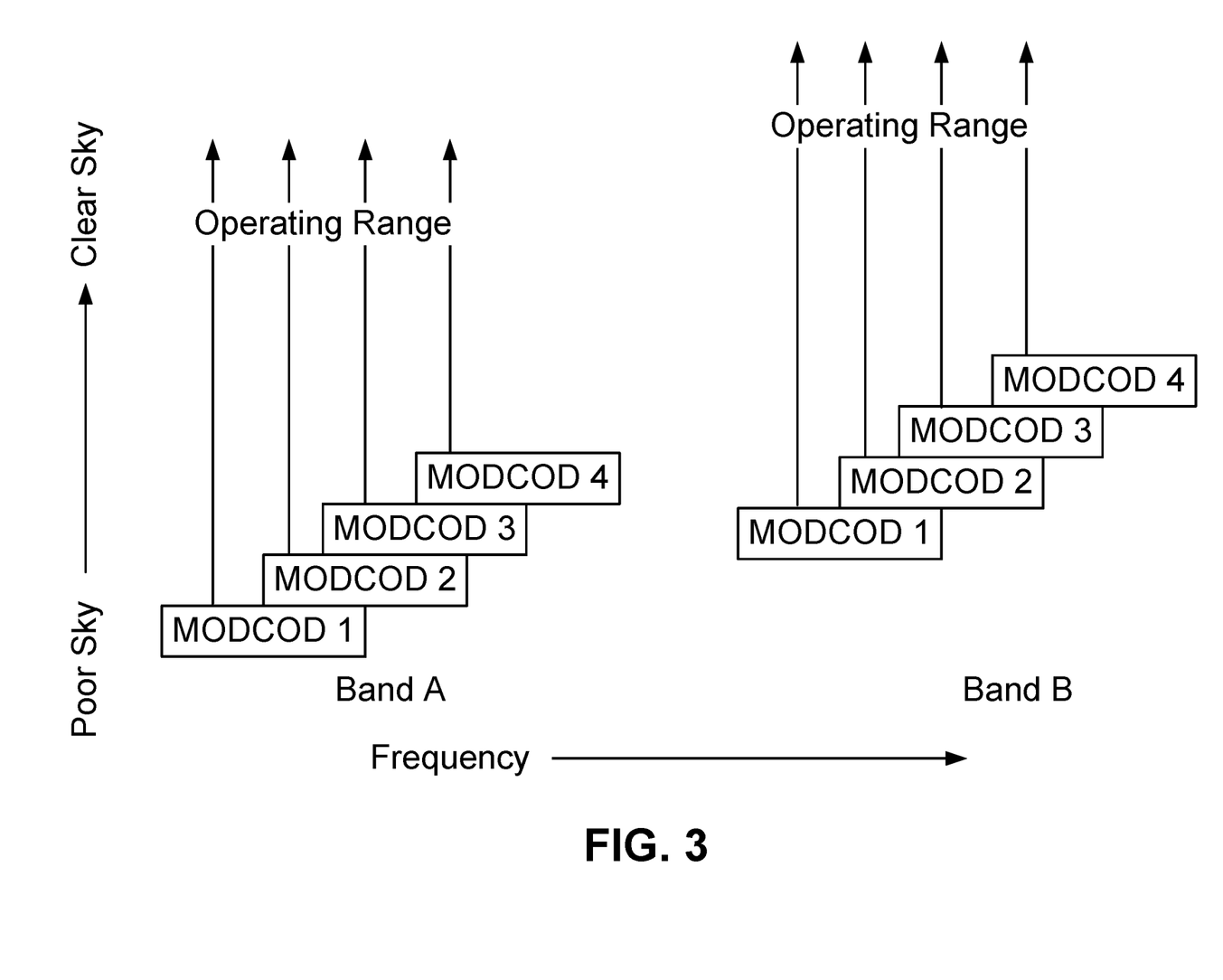
FIG. 3 graphically illustrates the relationships between sky conditions and MODCODS for two frequency bands.

As mentioned above, the estimates of link conditions for each band may include estimates of link conditions for each MODCOD supported by that band. In such cases, the traffic and control processing module 125 may select the band and the MODCOD for the terminal 120 to receive signals from the satellite 140. For example, the traffic and control processing module 125 may select the highest MODCOD possible in order to improve spectrum utilization. FIG. 3 graphically illustrates the relationships between sky conditions and MODCODS for two frequency bands. In FIG. 3, MODCOD 4 is the highest MODCOD, while MODCOD 1 is the lowest, and Band B is a higher-frequency band than Band A. As can be seen in FIG. 3, better sky conditions allow the use of higher MODCODS within a frequency band. And for a given sky condition, a lower frequency band allows higher MODCODS than a higher frequency band.

Techniques for selecting MODCOD based on link conditions are disclosed in a commonly-owned co-pending U.S. patent application entitled "Systems And Methods For Using Adaptive Coding And Modulation In A Regenerative Satellite Communication System," Ser. No. 15/281,737, filed Sep. 30, 2016, the disclosure thereof incorporated by reference herein in its entirety.

In some embodiments, the frequency band selection process includes consideration of desired link conditions. For example, the desired link conditions may reflect the terms of a service-level agreement (SLA) for the terminal 120. The frequency band selection process may include a comparison of the link conditions of the current band, and the estimates of the link conditions of one or more other bands, to the desired link conditions. The desired link conditions may be stored in the link conditions database 126 of the satellite terminal 120.

The traffic and control processing module 125 may consider other factors when selecting a frequency band for receiving signals from the satellite 140. For example, in order to provide improved load-balancing, these factors may include traffic levels on each band. In such examples, the traffic and control processing module 125 may determine current traffic levels for each band, and may consider current traffic levels in choosing the frequency band.

Referring again to FIG. 2, the process 200 may include controlling the multi-band satellite ground terminal to receive the signals transmitted by the satellite on the selected second frequency bands, at 210. For example, referring again to FIG. 1, the traffic and control processing module 125 may control the RX PHY 122 to receive signals from the satellite 140 on the Q band.

Referring again to FIG. 2, the process 200 may include transmitting band selection information to the gateway. For example, referring again to FIG. 1, the terminal 120 may inform the gateway 110 of the selection of the Q band for receiving the signals from the satellite 140. The terminal 120 may transmit this information to the gateway 110 over the inroute links. The gateway 110 may use this information, together with information indicative of traffic levels of other terminals in the satellite system 100, to perform functions such as load balancing among outroute frequency bands, and the like.

Figure 4:
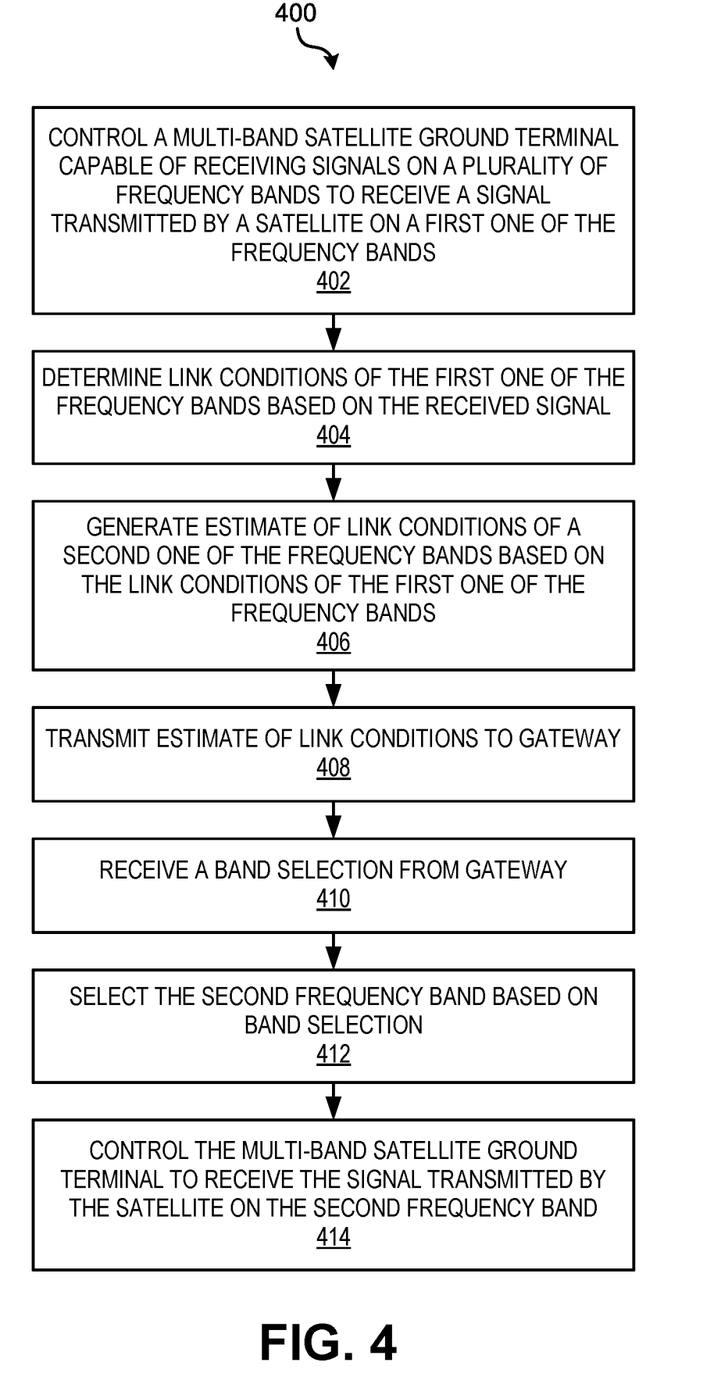
FIG. 4 illustrates a process for the satellite system where the gateway selects frequency bands for the terminal according to embodiments of the disclosed technology.

FIG. 4 illustrates a process 400 for the satellite system 100 where the gateway 110 selects frequency bands for the terminal 120 according to embodiments of the disclosed technology. While the process 400 is described for a terminal 120 capable of operating on only two frequency bands, it should be understood that the process 400 may easily be extended to a terminal 120 capable of operating on three or more frequency bands, for example as with the process 200 of FIG. 2.

Referring to FIG. 4, the process 400 may include controlling a multi-band satellite ground terminal capable of receiving signals on a plurality of frequency bands to receive a signal transmitted by the satellite on the first one of the frequency bands, at 402. For example, referring again to FIG. 1, the traffic and control processing module 125 may control the RX PHY 122 of the satellite terminal 120 receive the outroute signals from the satellite 140 on the Q band.

Referring again to FIG. 4, the process 400 may include determining conditions of the first one of the frequency bands based on the received signal, at 404. For example, referring again to FIG. 1, the RX PHY 122 and RX MAC/SLC 124 of the satellite terminal 120 may generate metrics indicative of the link conditions on the Q band, and may provide these metrics to the traffic and control processing module 125. The link conditions may include signal quality, signal level, other metrics, or combinations thereof. For example, the signal quality may be represented as SQF. As another example, the signal quality and signal level may be represented as a ratio of energy per symbol to noise power spectral density (EsNo).

Referring again to FIG. 4, the process 400 may include generating estimates of link conditions of a second frequency band based on the link conditions of the first one of the frequency bands, at 406. For example, referring again to FIG. 1, the traffic and control processing module 125 of the satellite terminal 120 may generate estimates of link conditions on the outroute Ku frequency band based on the link conditions determined for the Q band. The estimates for each band may include estimates of link conditions on that band for each of the MODCODS available for that band.

Referring again to FIG. 4, the process 400 may include transmitting the estimate of the link conditions to the gateway, at 408. For example, referring again to FIG. 1, the satellite terminal 120 may transmit the estimate to the gateway 110 using inroute links through the satellite 140. The traffic and control processing module 115 of the gateway 110 may select the second frequency band based on the estimate of the link conditions of the second frequency band, at 408, for example as described above with reference to FIG. 2.

The frequency band selection process may include a comparison of the link conditions of the current band, and the estimate of the link conditions of one or more other bands, to the desired link conditions. The desired link conditions may be stored in the link conditions database 116 of the gateway 110.

As mentioned above, the estimates of link conditions for each band may include estimates of link conditions for each MODCOD supported by that band. In such cases, the traffic and control processing module 115 of the gateway 110 may select the band and the MODCOD for the terminal 120 to receive signals from the satellite 140, for example as described above.

The traffic and control processing module 115 may consider other factors when selecting a frequency band for the terminal 120 to receive signals from the satellite 140. For example, the gateway may distribute terminals across bands when the traffic load on one band is too high. In this example, the estimated SQF (or alternatively the MODCOD) for the bands are transmitted from the terminals to the gateway to enable the gateway to determine the optimal placement of terminals across the frequency bands.

As another example, to keep the load distributed across bands efficiently, the system 100 may move terminals with higher SQF to higher frequency bands while keeping terminals with lower SQF in the lower frequency bands. As weather conditions change for the terminals, the system 100 may continually re-distribute the terminals based on the their current SQF to ensure optimal load distribution across the bands.

In some embodiments of the multi-band satellite system, only a subset of the terminals may operate in multi-band mode due to differing terminal capabilities. Some of the terminals may have hardware that not multi-band capable. For example, the radio may not have sufficient tuning and/or operating range. In systems such as these, the load balancing operations may consider terminal capability.

In some embodiments, some of the terminals that are capable of multi-band operation may not be eligible to operate in all of the bands, for example due to the terms of the corresponding service level agreement (SLA). In this example, one terminal may be eligible for higher availability versus another terminal, such that the first terminal may operate at a higher frequency band (which would generally provide more capacity), and may fall back to a lower band (which might have much more limited capacity) in case of rain, whereas the second terminal may not be eligible to operate at the lower band and is simply allowed to fade out of service in case of rain. In systems such as these, the load balancing operations may consider terminal eligibility.

In some embodiments, continuing the above example, even if both terminals are eligible to operate in both bands, one terminal (or set of terminals) may be given priority access to the lower (and less attenuated) frequency band in rain, and the other terminal(s) may only be given access to the lower frequency band if its limited capacity is not needed by the higher priority terminals. This prioritization may be specified by the terminal SLA. In systems such as these, the load balancing operations may consider terminal priority.

The gateway 110 may transmit band selection indicative of the selection of the second frequency band to the terminal 120, for example using outroute links through the satellite 140. Referring again to FIG. 4, the process 400 may include receiving the band selection indicative of the selection of the one of the second frequency bands, at 410, and may select the second frequency band based on the band selection, at 412. The process 400 may include controlling the multi-band satellite ground terminal 120 to receive the signals transmitted by the satellite on the selected one of the second frequency bands, at 412, for example as described above.

Figure 5:
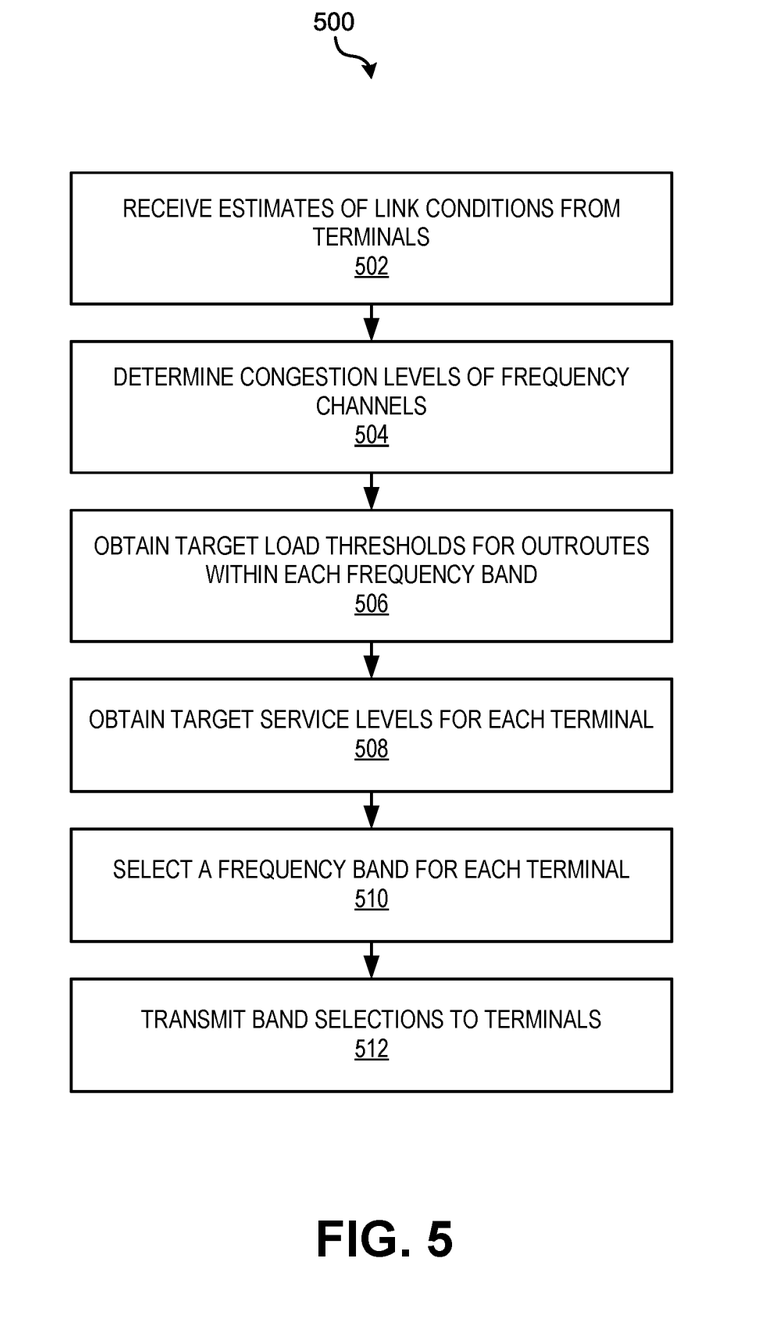
FIG. 5 illustrates a process where the gateway selects frequency bands for the terminal according to embodiments of the disclosed technology.

FIG. 5 illustrates a process 500 where the gateway 110 selects frequency bands for the terminal 120 according to embodiments of the disclosed technology. Referring to FIG. 5, process 500 may include receiving estimates of link conditions from the terminals in the satellite system 100, at 502. Referring to FIG. 1, the gateway 110 may receive estimates of link conditions generated by terminals 120, 130, and other terminals in the satellite system 100. These estimates may be determined by the terminals as described above.

Referring again to FIG. 5, the process 500 may include determining congestion levels of the frequency channels employed by the terminals on the outroutes, at 504. These congestion levels may be determined by the gateway 110 either alone, or in conjunction with the terminals 120, 130.

The process 500 may include obtaining target load thresholds for the outroutes within each frequency band, at 506. For example, the target load thresholds may specify a maximum traffic load, a minimum traffic load, other traffic loads, or combinations thereof. These thresholds may be stored at the gateway 110.

The process 500 may include obtaining target service levels for each terminal, at 508. Each service level may be determined by a SLA, for example as described above. These service levels may be stored at the gateway 110.

The process 500 may include selecting a frequency band for each terminal, at 510. The selection process may consider the estimates of link conditions reported by the terminals, the determined congestion levels of the frequency channels, the target load thresholds for the help routes within each frequency band, the target service levels for each terminal, or any combination thereof.

The process 500 may include transmitting band selections to the terminals, at 512. Each band selection may include a selection of frequency band, a selection of frequency channel, a selection of MODCOD, or any combination thereof. Upon receiving the band selections, terminals begin to operate according to those selections.

In some embodiments, the disclosed terminals may also or alternatively be capable of operating on multiple inroute frequency bands concurrently. In some embodiments, the above-disclosed systems and methods are easily adapted to accommodate the selection and concurrent use of multiple frequency bands by a terminal, as will be apparent to one skilled in the relevant art.

In these embodiments, terminal receive signal quality in one band may be used to estimate terminal transmit link conditions across multiple other bands, recognizing that the same rain attenuation path will affect both the terminal uplink and downlink signal. Terminal transmit signal quality in one band (as measured and relayed by the gateway) may be used to estimate terminal transmit link conditions across one or more other bands.

Figure 6:
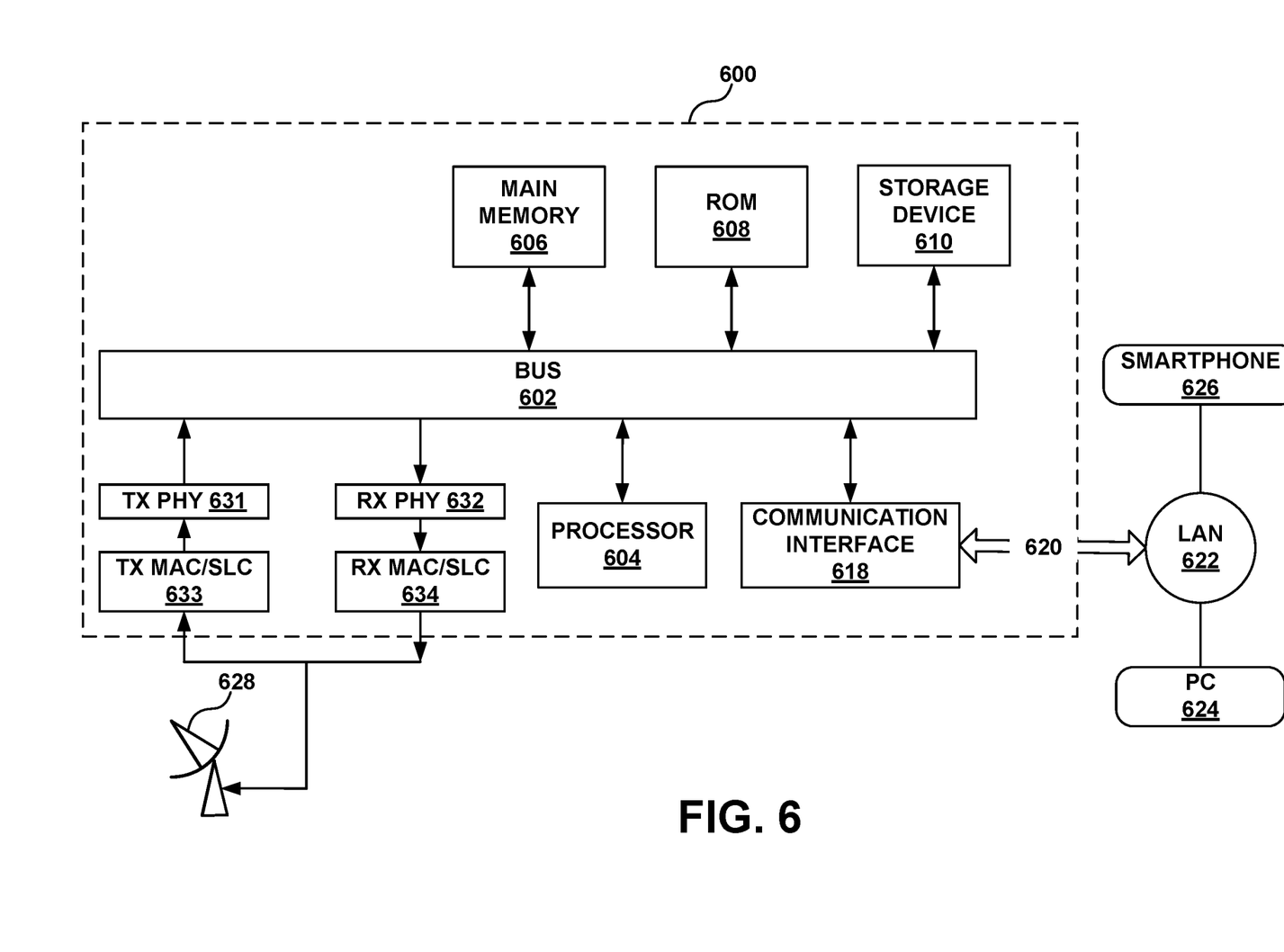
FIG. 6 illustrates a computer system upon which example embodiments according to the present disclosure can be implemented.

FIG. 6 illustrates a computer system 600 upon which example embodiments according to the present disclosure can be implemented. Computer system 600 can include a bus 602 or other communication mechanism for communicating information, and a processor 604 coupled to bus 602 for processing information. Computer system 600 may also include main memory 606, such as a random access memory (RAM) or other dynamic storage device, coupled to bus 602 for storing information and instructions to be executed by processor 604. Main memory 606 can also be used for storing temporary variables or other intermediate information during execution of instructions to be executed by processor 604. Computer system 600 may further include a read only memory (ROM) 608 or other static storage device coupled to bus 602 for storing static information and instructions for processor 604. A storage device 610, such as a magnetic disk or optical disk, may additionally be coupled to bus 602 for storing information and instructions.

Computer system 600 may be implemented as an embedded system, and so may be implemented without a user interface.

According to one embodiment of the disclosure, satellite noise and interference calibration, in accordance with example embodiments, are provided by computer system 600 in response to processor 604 executing an arrangement of instructions contained in main memory 606. Such instructions can be read into main memory 606 from another computer-readable medium, such as storage device 610. Execution of the arrangement of instructions contained in main memory 606 causes processor 604 to perform one or more processes described herein. One or more processors in a multi-processing arrangement may also be employed to execute the instructions contained in main memory 606. In alternative embodiments, hard-wired circuitry is used in place of or in combination with software instructions to implement various embodiments. Thus, embodiments described in the present disclosure are not limited to any specific combination of hardware circuitry and software.

Computer system 600 may also include a communication interface 618 coupled to bus 602. Communication interface 618 can provide a two-way data communication coupling to a network link 620 connected to a local network 622. By way of example, communication interface 618 may be a digital subscriber line (DSL) card or modem, an integrated services digital network (ISDN) card, a cable modem, or a telephone modem to provide a data communication connection to a corresponding type of telephone line. As another example, communication interface 618 may be a local area network (LAN) card (e.g. for Ethernet™ or an Asynchronous Transfer Model (ATM) network) to provide a data communication connection to a compatible LAN. Wireless links can also be implemented. In any such implementation, communication interface 618 sends and receives electrical, electromagnetic, or optical signals that carry digital data streams representing various types of information. Further, communication interface 618 may include peripheral interface devices, such as a Universal Serial Bus (USB) interface, a PCMCIA (Personal Computer Memory Card International Association) interface, etc.

Network link 620 typically provides data communication through one or more networks to other data devices. By way of example, network link 620 can provide a connection through local network 622 to network devices, for example including a host computer (PC) 624, a smartphone 626, and the like. Local network 622 may both use electrical, electromagnetic, or optical signals to convey information and instructions. The signals through the various networks and the signals on network link 620 and through communication interface 618, which communicate digital data with computer system 600, are example forms of carrier waves bearing the information and instructions.

Computer system 600 may send messages and receive data, including program code, through the network(s), network link 620, and communication interface 618. In the Internet example, a server (not shown) might transmit requested code belonging to an application program for implementing an embodiment of the present disclosure through local network 622 and communication interface 618. Processor 604 executes the transmitted code while being received and/or store the code in storage device 610, or other non-volatile storage for later execution. In this manner, computer system 600 obtains application code in the form of a carrier wave.

Computer system 600 may include equipment for communication between the bus 602 and a terrestrial satellite dish 628. in particular, the computer system 600 may include a transmit-side physical-layer device/multi-band tuner (TX PHY) 631, a receive-side physical-layer device/multi-band tuner (RX PHY) 632, a transmit-side media access controller/satellite link controller (TX MAC/SLC) 633, and a receive-side media access controller/satellite link controller (TX MAC/SLC) 634. These elements may operate as described above for TX PHY 121, RX PHY 122, TX MAC/SLC 123, and TX MAC/SLC 124.

The term "computer-readable medium" as used herein refers to any medium that participates in providing instructions to processor 604 for execution. Such a medium may take many forms, including but not limited to non-volatile media, volatile media, and transmission media. Non-volatile media include, for example, optical or magnetic disks, such as storage device 610. Volatile media may include dynamic memory, such as main memory 606. Transmission media may include coaxial cables, copper wire and fiber optics, including the wires that comprise bus 602. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present disclosure may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 7:
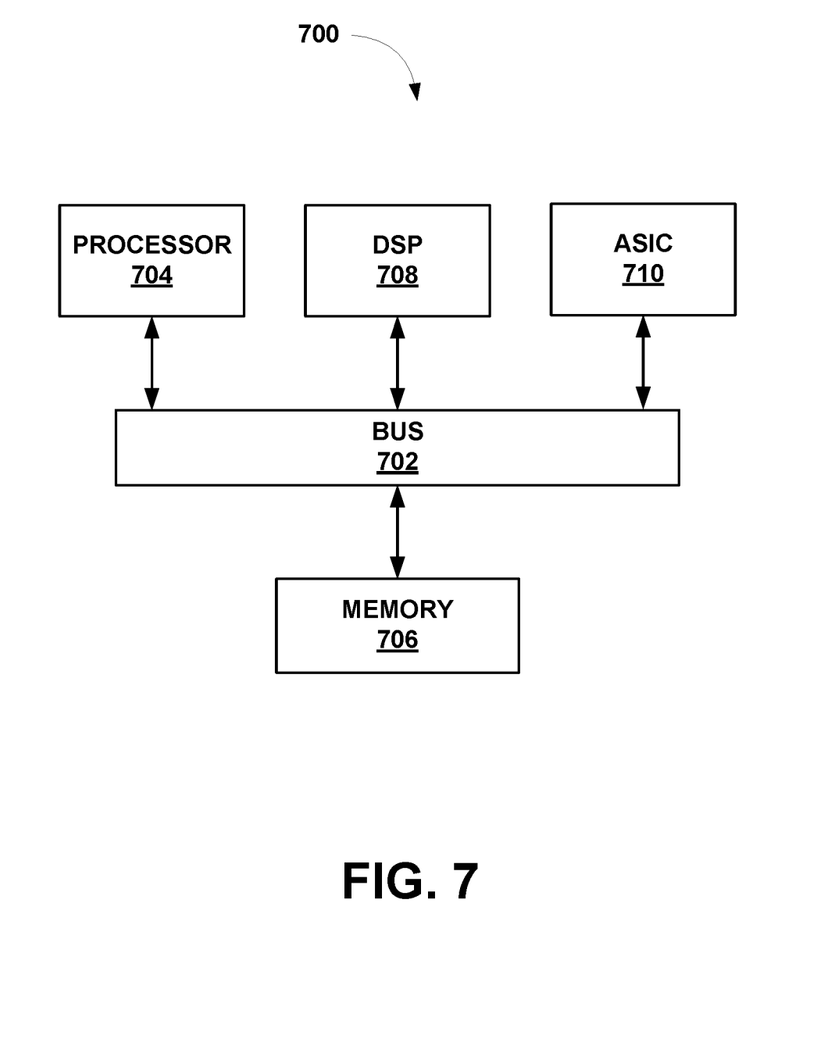
FIG. 7 illustrates a chip set in which embodiments of the disclosure may be implemented.

FIG. 7 illustrates a chip set 700 in which embodiments of the disclosure may be implemented. Chip set 700 can include, for instance, processor and memory components described with respect to FIG. 7 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 700 includes a communication mechanism such as a bus 1002 for passing information among the components of the chip set 700. A processor 704 has connectivity to bus 702 to execute instructions and process information stored in a memory 706. Processor 704 includes one or more processing cores with each core configured to perform independently. A multi-core processor enables multiprocessing within a single physical package. Examples of a multi-core processor include two, four, eight, or greater numbers of processing cores. Alternatively or in addition, processor 704 includes one or more microprocessors configured in tandem via bus 702 to enable independent execution of instructions, pipelining, and multithreading. Processor 1004 may also be accompanied with one or more specialized components to perform certain processing functions and tasks such as one or more digital signal processors (DSP) 708, and/or one or more application-specific integrated circuits (ASIC) 710. DSP 708 can typically be configured to process real-world signals (e.g., sound) in real time independently of processor 704. Similarly, ASIC 710 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 704 and accompanying components have connectivity to the memory 706 via bus 702. Memory 706 includes both dynamic memory (e.g., RAM) and static memory (e.g., ROM) for storing executable instructions that, when executed by processor 704, DSP 708, and/or ASIC 710, perform the process of example embodiments as described herein. Memory 706 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A multi-band satellite terminal capable of receiving signals on a plurality of frequency bands, comprising:
   a hardware processor; and
   a non-transitory machine-readable storage medium storing instructions executable by the hardware processor to perform a method comprising:
      controlling a multi-band satellite terminal capable of receiving signals on a plurality of frequency bands to receive a signal transmitted by a satellite on a first frequency band of the plurality of frequency bands;
      determining link conditions of the first frequency band based on the received signal;
      generating an estimate of link conditions of a second frequency band of the plurality of frequency bands, wherein the estimate is generated based on the link conditions of the first frequency band;
      determining a current traffic level for the second frequency band;
      selecting the second frequency band based on the estimate of the link conditions of the second frequency band and the current traffic level for the second frequency band; and
      controlling the multi-band satellite ground terminal to receive the signal transmitted by the satellite on the second frequency band.

2. The multi-band satellite terminal of claim 1, the method further comprising:
   comparing the estimate of the link conditions to desired link conditions; and
   selecting the second frequency band based on the comparing.

3. The multi-band satellite terminal of claim 2, wherein the estimate of the link conditions include an estimate of the link conditions for a plurality of modulation and coding schemes, the method further comprising:
   selecting one of the modulation and coding schemes based on the estimates of the link conditions for the plurality of modulation and coding schemes; and
   controlling the multi-band satellite ground terminal to receive the signal transmitted by the satellite using the selected one of the modulation and coding schemes.

4. The multi-band satellite terminal of claim 1, wherein: the link conditions comprise at least one of signal quality or signal level.

5. The multi-band satellite terminal of claim 1, the method further comprising:
   transmitting the estimate of the link conditions to a gateway;
   receiving a band selection from the gateway; and
   selecting the second frequency band based on the band selection.

6. The multi-band satellite terminal of claim 1, wherein the multi-band satellite terminal comprises a very small aperture terminal (VSAT).

7. A non-transitory machine-readable storage medium storing instructions executable by a hardware processor of a computing component, the machine-readable storage medium comprising instructions to cause the hardware processor to perform a method comprising:
   controlling a multi-band satellite terminal capable of receiving signals on a plurality of frequency bands to receive a signal transmitted by a satellite on a first frequency band of the plurality of frequency bands;
   determining link conditions of the first frequency band based on the received signal;
   generating an estimate of link conditions of a second frequency band of the plurality of frequency bands, wherein the estimate is generated based on the link conditions of the first frequency band;
   determining a current traffic level for the second frequency band;
   selecting the second frequency band based on the estimate of the link conditions of the second frequency band and the current traffic level for the second frequency band; and
   controlling the multi-band satellite ground terminal to receive the signal transmitted by the satellite on the second frequency band.

8. The non-transitory machine-readable storage medium of claim 7, the method further comprising:
   comparing the estimate of the link conditions to desired link conditions; and
   selecting the second frequency band based on the comparing.

9. The non-transitory machine-readable storage medium of claim 8, wherein the estimate of the link conditions include an estimate of the link conditions for a plurality of modulation and coding schemes, the method further comprising:
   selecting one of the modulation and coding schemes based on the estimates of the link conditions for the plurality of modulation and coding schemes; and
   controlling the multi-band satellite ground terminal to receive the signal transmitted by the satellite using the selected one of the modulation and coding schemes.

10. The non-transitory machine-readable storage medium of claim 7, wherein:
    the link conditions comprise at least one of signal quality or signal level.

11. The non-transitory machine-readable storage medium of claim 7, the method further comprising:
    transmitting the estimate of the link conditions to a gateway;
    receiving a band selection from the gateway; and
    selecting the second frequency band based on the band selection.

12. The non-transitory machine-readable storage medium of claim 7, wherein the terminal comprises a very small aperture terminal (VSAT).

13. A method, comprising:
    controlling a multi-band satellite terminal capable of receiving signals on a plurality of frequency bands to receive a signal transmitted by a satellite on a first frequency band of the plurality of frequency bands;
    determining link conditions of the first frequency band based on the received signal;
    generating an estimate of link conditions of a second frequency band of the plurality of frequency bands, wherein the estimate is generated based on the link conditions of the first frequency band;
    determining a current traffic level for the second frequency band;
    selecting the second frequency band based on the estimate of the link conditions of the second frequency band and the current traffic level for the second frequency band; and
    controlling the multi-band satellite ground terminal to receive the signal transmitted by the satellite on the second frequency band.

14. The method of claim 13, further comprising:
    comparing the estimate of the link conditions to desired link conditions; and selecting the second frequency band based on the comparing.

15. The method of claim 14, wherein the estimate of the link conditions include an estimate of the link conditions for a plurality of modulation and coding schemes, the method further comprising:
selecting one of the modulation and coding schemes based on the estimates of the link conditions for the plurality of modulation and coding schemes; and
controlling the multi-band satellite ground terminal to receive the signal transmitted by the satellite using the selected one of the modulation and coding schemes.

16. The method of claim 13, wherein:
the link conditions comprise at least one of signal quality or signal level.

17. The method of claim 13, further comprising:
transmitting the estimate of the link conditions to a gateway;
receiving a band selection from the gateway; and
selecting the second frequency band based on the band selection.

18. A multi-band satellite terminal capable of receiving signals on a plurality of frequency bands, comprising:
a hardware processor; and
a non-transitory machine-readable storage medium storing instructions executable by the hardware processor to perform a method comprising:
controlling a multi-band satellite terminal capable of receiving signals on a plurality of frequency bands to receive a signal transmitted by a satellite on a first frequency band of the plurality of frequency bands;
determining link conditions of the first frequency band based on the received signal;
generating an estimate of link conditions of a second frequency band of the plurality of frequency bands, wherein the estimate is generated based on the link conditions of the first frequency band, and wherein the estimate of the link conditions include an estimate of the link conditions for a plurality of modulation and coding schemes;
comparing the estimate of the link conditions to desired link conditions;
selecting the second frequency band based on the estimate of the link conditions of the second frequency band and the comparing;
controlling the multi-band satellite ground terminal to receive the signal transmitted by the satellite on the second frequency band;
selecting one of the modulation and coding schemes based on the estimates of the link conditions for the plurality of modulation and coding schemes; and
controlling the multi-band satellite ground terminal to receive the signal transmitted by the satellite using the selected one of the modulation and coding schemes.

19. The multi-band satellite terminal of claim 18, wherein:
the link conditions comprise at least one of signal quality or signal level.

20. The multi-band satellite terminal of claim 18, the method further comprising:
determining a current traffic level for the second frequency band; and
selecting the second frequency bands based on the current traffic levels.

21. The multi-band satellite terminal of claim 18, the method further comprising:
transmitting the estimate of the link conditions to a gateway;
receiving a band selection from the gateway; and
selecting the second frequency band based on the band selection.

22. The multi-band satellite terminal of claim 18, wherein the multi-band satellite terminal comprises a very small aperture terminal (VSAT).

23. A non-transitory machine-readable storage medium storing instructions executable by a hardware processor of a computing component, the machine-readable storage medium comprising instructions to cause the hardware processor to perform a method comprising:
controlling a multi-band satellite terminal capable of receiving signals on a plurality of frequency bands to receive a signal transmitted by a satellite on a first frequency band of the plurality of frequency bands;
determining link conditions of the first frequency band based on the received signal;
generating an estimate of link conditions of a second frequency band of the plurality of frequency bands, wherein the estimate is generated based on the link conditions of the first frequency band, and wherein the estimate of the link conditions include an estimate of the link conditions for a plurality of modulation and coding schemes;
comparing the estimate of the link conditions to desired link conditions;
selecting the second frequency band based on the estimate of the link conditions of the second frequency band and the comparing;
controlling the multi-band satellite ground terminal to receive the signal transmitted by the satellite on the second frequency band;
selecting one of the modulation and coding schemes based on the estimates of the link conditions for the plurality of modulation and coding schemes; and
controlling the multi-band satellite ground terminal to receive the signal transmitted by the satellite using the selected one of the modulation and coding schemes.

24. The non-transitory machine-readable storage medium of claim 23, wherein:
the link conditions comprise at least one of signal quality or signal level.

25. The non-transitory machine-readable storage medium of claim 23, the method further comprising:
determining a current traffic level for the second frequency band; and
selecting the second frequency bands based on the current traffic levels.

26. The non-transitory machine-readable storage medium of claim 23, the method further comprising:
transmitting the estimate of the link conditions to a gateway;
receiving a band selection from the gateway; and
selecting the second frequency band based on the band selection.

27. The non-transitory machine-readable storage medium of claim 23, wherein the terminal comprises a very small aperture terminal (VSAT).

28. A method, comprising:
controlling a multi-band satellite terminal capable of receiving signals on a plurality of frequency bands to receive a signal transmitted by a satellite on a first frequency band of the plurality of frequency bands;
determining link conditions of the first frequency band based on the received signal;

generating an estimate of link conditions of a second frequency band of the plurality of frequency bands, wherein the estimate is generated based on the link conditions of the first frequency band, and wherein the estimate of the link conditions include an estimate of the link conditions for a plurality of modulation and coding schemes;

comparing the estimate of the link conditions to desired link conditions;

selecting the second frequency band based on the estimate of the link conditions of the second frequency band and the comparing;

controlling the multi-band satellite ground terminal to receive the signal transmitted by the satellite on the second frequency band;

selecting one of the modulation and coding schemes based on the estimates of the link conditions for the plurality of modulation and coding schemes; and controlling the multi-band satellite ground terminal to receive the signal transmitted by the satellite using the selected one of the modulation and coding schemes.

29. The method of claim 28, wherein:
the link conditions comprise at least one of signal quality or signal level.

30. The method of claim 28, further comprising:
determining a current traffic level for the second frequency band; and
selecting the second frequency bands based on the current traffic levels.

31. The method of claim 28, further comprising:
transmitting the estimate of the link conditions to a gateway;
receiving a band selection from the gateway; and
selecting the second frequency band based on the band selection.

32. The method of claim 28, wherein the terminal comprises a very small aperture terminal (VSAT).

* * * * *